United States Patent Office 3,513,115
Patented May 19, 1970

3,513,115
COATING COMPOSITION FOR METAL CONTAINERS
Joseph J. Tryzna, Evergreen Park, and George L. Becker, Chicago, Ill., assignors to Continental Can Company, Inc., New York, N.Y., a corporation of New York
No Drawing. Filed Dec. 12, 1967, Ser. No. 689,789
Int. Cl. C08f 29/24
U.S. Cl. 260—21
10 Claims

ABSTRACT OF THE DISCLOSURE

A coating composition for metal food containers which may be applied directly to a metal substrate is prepared from a dispersion in a volatile organic solvent of (1) an organosol film component composed of (a) a dispersion grade vinyl chloride homopolymer; (b) a solution grade vinyl chloride copolymer resin, and (c) a plasticizer; (2) an adhesion promoting component comprised of a methylol phenol ether and a low molecular weight epoxy resin; and (3) a heat stabilizing component of a triazine-aldehyde resin and an epoxidized triglyceride.

BACKGROUND OF THE INVENTION

Field of Invention

This invention relates to coating compositions and more particularly to a coating composition designed for use as a protective coating for metal containers.

The Prior Art

Metal sheet used for the manufacture of the containers has a protective organic coating baked on the sheet metal substrate. Such coated metal sheets are then fabricated into coated metal containers.

High speed operations of container fabrication from the precoated sheet metal imposes important qualifications on the organic coatings. A particularly important qualification is that the cured organic coating must be adequately flexible to be fracture resistant under the conventional mechanical operations associated with stamping or cutting the container body and end closure parts into coated containers. The organic coating must also be adequately flexible to be fracture resistant under the heat and pressure conditions during manufacture of the container and in canning of the comestible during heat processing to which the coated container is being subjected. Lack of fracture resistance is a common failure in many potentially useful coatings.

It has heretofore been a practice to employ organosol coatings in the coating of metal containers. Generally, an organosol is composed of vinyl resins, such as polyvinyl chloride, and a vinyl copolymer dispersed in a suitable solvent containing a plasticizer. Difficulty has been experienced because the organosol coatings have generally inadequate adhesion to bare metal surfaces.

It has been the custom in applying organosol coatings to metal to first apply a primer coating to the metal surface to which the organosol can then be applied and made to adhere by baking. This procedure, which requires two coating operations, is costly and it would be more advantageous to have an organosol coating composition which could be applied directly to the metal surface without the primer coating.

SUMMARY OF THE INVENTION

In accordance with the present invention, there is provided a coating composition which can be directly applied to metal surfaces and is adequately flexible to be resistant to fracturing under the mechanical operations involved in fabricating a coated container from a precoated metal sheet, the composition comprising a homogenous mixture dispersed in a volatile organic solvent of (1) an organosol component containing (a) a dispersion grade vinyl chloride homopolymer resin, (b) a solution grade vinyl chloride copolymer resin, and (c) a plasticizer; (2) an adhesion promoting component combination of a methylol phenol ether and a low molecular weight epoxy resin; and (3) a heat stabilizing component combination of a triazine-aldehyde resin and an epoxidized triglyceride.

The coating compositions of the present invention are capable of being directly spread on sheet metal, such as tin-free steel, and baked to give a coated sheet which can be fabricated into containers without loss of adhesion and film integrity. The resultant containers are capable of withstanding processing at 155° F. without film degradation, such as loss of adhesion, film softening, and discoloration.

PREFERRED EMBODIMENTS

The organosol component of the coating composition is present in the range of about 60% to about 90% by weight of the non-volatile constituents of the coating composition.

The dispersion grade vinyl chloride homopolymer resin useful in preparing the organosol component of the coating compositions has an inherent viscosity ranging from about 1.20 to about 1.35 as measured in cyclohexanone at 30° C. according to ASTM D–1243 Method A, and constitutes about 50% to about 75% by weight of the organosol components of the coating composition. Advantageously, the vinyl chloride homopolymer resin has a particle size between 0.2 and 1.2 micron. A particle size of 0.6 to 0.9 micron is preferred.

Dispersion grade vinyl chloride homopolymer resins are available commercially. An example of such a commercial resin is Bakelite QYNV, a product of Union Carbide Plastics Company, which is composed of about 98% to about 99% by weight polyvinyl chloride and has a specific gravity of about 1.40 and an inherent viscosity of from about 1.27 to 1.33.

The solution grade vinyl chloride copolymer resin contains a major amount of vinyl chloride (i.e., above about 60%) and has an inherent viscosity of about 0.33 to 0.56, and constitutes about 10% to about 25% by weight of the organosol coating components.

Vinyl chloride copolymer resins which may advantageously be employed in the present invention include vinyl chloride/vinyl acetate copolymers, vinyl chloride/vinyl acetate/maleic anhydride copolymers, vinyl chloride/vinyl acetate/maleic acid copolymers, and vinyl chloride/vinyl acetate/vinyl alcohol copolymers.

Solution grade vinyl chloride copolymer resins are available commercially. Illustrative examples of the commercially available resins include Bakelite VMCH, a product of Union Carbide Plastics Company, composed of about 86% by weight vinyl chloride, about 13% by weight vinyl acetate, and about 1% by weight maleic anhydride with an inherent viscosity of about 0.50; Bakelite VMCC, a product of Union Carbide Plastics Company, composed of about 83% by weight vinyl chloride, about 16% by weight vinyl acetate, and about 1% by weight maleic acid with an inherent viscosity of about 0.37; Bakelite VAGH, a product of the Union Carbide Plastics Company, containing about 91% by weight vinyl chloride, about 3% by weight vinyl acetate, and about 6% by weight vinyl alcohol with an inherent viscosity of about 0.52.

The plasticizer used to prepare the organosol coating composition includes alkyl phthalates, alkyl esters of alkane dicarboxylic acids and alkyl and aryl phosphates. The plasticizer generally comprises about 10% to about 25% of the organosol component. Illustrative examples of plasticizer compositions which may be used in the present invention include octylphthalate, dioctylphthalate, diisooctylphthalate, didecylphthalate, dioctyladipate, diisoadipate, dibutyladipate, diisodecyladipate, dibutylsebacate, dioctylsebacate, and 2-ethyl hexyl diphenyl phosphate (Santicizer 141, available from Monsanto Chemical Co.).

The methylol phenol ether useful in the practice of the present invention is represented by the general formula:

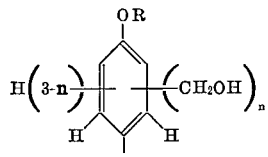

wherein R represents a member of the class consisting of aliphatic, cycloaliphatic and aryl-substituted aliphatic groups including their halogenated derivatives, and $n$ represents an integer of from 1 to 3.

Among the organic groups which R in the above formula may represent are include alkyl groups, e.g., methyl, ethyl, butyl, propyl, isopropyl; unsaturated aliphatic, e.g., vinyl, allyl, methallyl, cyclopentyl, cyclohenenyl, etc.; cyclohexaryl, cyclopentaryl, etc.; aralkyl, for instance benzyl, etc.; styryl, as well as halogenated derivatives of the aforementioned aliphatic groups, for example, the aforementioned groups containing chlorine, bromine, fluorine; either the aliphatic or aromatic grouping, and either monohalogenated or polyhalogenated, for example, containing from two or more halogens, for example, chlorine, in the organic group.

The methylol phenol ethers are available commercially. An example of a commercially available methylol phenol ether is GE 75108 Methylon, a product of the General Electric Company, which is a mixture of the allyl ethers of mono-, di-, and trimethylol phenols.

The epoxy resins employed in the invention of this application are the polymeric reaction products of polyfunctional halohydrins with polyhydric phenols having the structural formula:

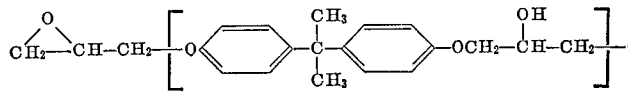

wherein X represents the number of molecules condensed. Typical polyfunctional halohydrins are epichlorohydrin, glycerol dichlorohydrin, and the like. Typical polyhydric phenols are resorcinol and a 2,2-bis(4-hydroxyphenyl)alkane, the latter resulting from the condensation of phenols with aldehydes and ketones, including formaldehyde, acetaldehyde, propionaldehyde, acetone, methyl ethyl ketone and the like, which result in sucs compounds as 2,2-bis(4-hydroxyphenyl)propane and like compounds. These epoxy resins normally contain terminal epoxy groups but may contain terminal epoxy groups and terminal hydroxyl groups.

The molecular weight of the epoxy resins may be controlled by the relative proportions of the reactants as well as by the extent to which the reaction is carried.

In the present invention, only those epoxy resins which are of sufficiently low molecular weight as to be compatible with the organosol components are utilized. Generally, epoxy resins having an average molecular weight in the range of 300 to 450 may be used.

Epoxy resins are available commercially. Preferred examples are ERL 2772 and ERL 2774, products of Union Carbide Plastics Company which are the condensation products of epichlorohydrin and Bisphenol A (dihydroxydiphenyl-dimethyl methane) and have a respective epoxy assay of 180 to 195 and 185 to 195 grams of sample per gram mole of epoxy group (gram/gram mole). The average molecular weight of an epoxy resin is approximately twice the epoxy assay.

The adhesion promoting combination of the methylol phenol ether and epoxy resin generally comprises about 7.5% to about 30% by weight of the non-volatile constituents of the coating composition. The methylol phenol ether-epoxy resin combination is incorporated in the coating composition preferably at a weight ratio of methylol phenol ether to epoxy resin between 1:3 to 1:5 although the ratio may be as low as 1:12.5.

The presence of the combination of the methylol phenol and epoxy resin in the coating composition results in improved adhesion, scuff resistance, increased water resistance and cohesive strength of the resulting film.

The epoxidized triglycerides which may be used in the practice of the present invention are oxirane containing fatty acyl derivatives such as epoxidized linseed oil, epoxidized fish oils, or epoxidized perilla oil wherein the unsaturation present in the fatty acyl radical of the naturally occurring oil is substantially converted to oxirane groups providing a high oxirane triglyceride. These epoxidized oils are very low viscosity fluids having a residual iodine value of not more than 10. It is an essential and critical feature of the present invention that the epoxidized triglycerides used have an oxirane content of at least 7.5%. If the epoxidized triglyceride used in the coating composition has less than 7.5% of oxirane content, the coating has substantially inferior heat resistance.

A preferred epoxidized triglyceride is epoxidized linseed oil. The epoxidized linseed oil may be represented as having the following formula:

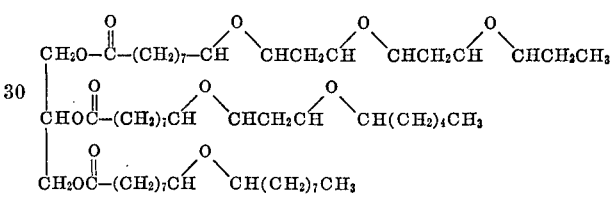

The epoxidized linseed oil is a highly reactive polyepoxide monomer containing on the average of 5.5 epoxy groups plus 3 reactive ester linkages per molecule. Epoxidized linseed oil is obtainable commercially from

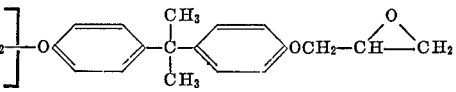

Swift & Company under the tradename of Epoxol 9-5. This epoxidized linseed oil has the following properties:

Equivalent weight/epoxy group—175 to 178
Equivalent weight/ester group—318 to 333
Molecular weight—980 approx.
Oxirane content—9% minimum
Iodine value—5 maximum
Gardner viscosity at 25° C.—880 cps.
Acid No.—0.3 maximum
Specific gravity—1.013 to 1.027

Triazine-aldehyde resins used in the invention of this application are prepared by the condensation of an aldehyde, particularly formaldehyde, with a triazine such as melamine.

One useful type of melamine-formaldehyde resin is readily obtained, for example, by the method of U.S. Pat. 2,529,856 which involves reacting a lower alkanol with a polymethylol melamine in the presence of an acid for such length of time as is necessary to obtain reaction of the alkanol with the polymethylol melamine.

In the preparation of melamine/aldehyde resins, the methylol melamine may be prepared first followed by etherification or "butylation." However, it is more general to react all the ingredients together under slightly acid conditions. The characteristics of the finished resin will depend upon a number of variables, including the formaldehyde ratio, degree of etherification, type and amount of acid catalyst, and type and temperature of the reaction. In general, from 5 to 6 moles of formaldehyde are used with 1 mole of melamine and an excess of butanol slightly acidified. The mixture is heated to a reflux and the reaction continued until a required viscosity is obtained. The water is removed by continuous decantation, and the acidity is neutralized before concentration of the resin.

In addition to melamine, other triazines or their derivitives, for example, 2-chloro-4,6-diamine-1,3,5-triazine, 2 - phenyl-4-amino-6-hydroxyl-1,3,5-triazine, 6 - methyl-2,4-diamino-1,3,5-triazine, and the like, may also be utilized to prepare useful triazine-aldehyde resins.

Triazine-aldehyde resins are available commercially. Examples of commercially available triazine-aldehyde resins which may be used in the present invention include MX–61, a butylated benzoquanamine/formaldhyde resin produced by Rohm and Haas, sold as 60% solids, and QR–336, 100% butylated benzoguanamine, MM–47 and MM–55, polycondensation products of melamine, formaldehyde and butanol, and Cymel 300, which is hexamethoxy methyl melamine, and is available from American Cyanamide.

The incorporation of the triazine-aldehyde resin in the coating composition is a critical feature of the present invention. In the absence of the triazine-aldehyde resin, the coating has unsatisfactory resistance to the elevated temperatures used for the curing of the coating and during processing.

The combination of the triazine-aldehyde resin and the epoxidized triglyceride generally comprises about 0.5% to about 10% by weight of the non-volatile constituents of the coating composition. The ratio by weight of the triazine-aldehyde resin to the epoxidized triglyceride is generally maintained within the range of 1:3 to 3:1.

Pigments are optional ingredients. Any of the solid pigments normally used in the art for coloring polyvinyl chloride plastics may be used, including the reinforcing and extending pigments, such as barium sulfate, titanium dioxide, and aluminum flake, to impart opaqueness and color. The pigment may be included in amounts ranging from 1% for organic to 50% for inorganic, based on the weigth of the total solids.

In preparing the coating compositions of the present invention, the triazine-aldehyde resin, the epoxidized triglyceride, the vinyl copolymer resin, and the plasticizer are disolved in a solvent blend, such as a mixture of ketones and aromatic hydrocarbons until these components are completely dissolved. To the solution is added the dispersion grade vinyl chloride homopolymer resin and an aliphatic hydrocarbon, and the components are vigorously mixed until the solids components become fully solvated. To the solvated resins are then added the methylol phenol ether and the epoxy resin, and these components are mixed until a homogenous mixture is obtained.

Suitable ketones which can be employed in the practice of the present invention include methyl ethyl ketone, isophorone, cyclohexanone and diisobutylketone. Aromatic hydrocarbon solvents include benzene, toluene, xylene, and commercially available aromatic naphtha mixtures, such as Solvesso 100 or 150.

Suitable aliphatic hydrocarbons include VM and P naphthas and isoparaffinic hydrocarbons, such as the Isopar solvents commercially available from the Humble Oil and Refining Company, which are a mixture of C–8 isomers having a boiling point between 240° and 290° F.

The coating compositions of this invention can be satisfactorily applied at a solids content ranging from about 20% to about 70% by weight, based on the total weight of the liquid coating composition. Generally, a solids content of 40% to 65% by weight is preferred.

The liquid coating compositions can be satisfactorily applied by any of the conventional methods employed by the coating industry. However, for coating of sheet metal used in container fabrication, roller coating is a preferred method, as the desired coating weight is easily and conveniently applied in a single coat and the liquid coating can be applied at a non-volatile content as high as about 70% by weight. For general coating purposes, spraying, dipping and flow coating are also useful methods of application.

After applying the coating, the coating, after substantial loss of solvent, is cured by heating the coated substrate at a temperature of about 350° F. to about 600° F. for a period of about 20 minutes to about 1 minute.

The preferred coating weight for coating metal sheet substrates with an adequately protective organic coating for use as a coating for containers is in the range of 2.5 to 15.0 milligrams of dry coating per square inch of substrate surface. At coating weights lower than 2.0 milligrams per square inch, the coating ordinarily is not sufficiently protective and not adequately fracture resistant to either the mechanical operations of container fabrication or the conditions associated with heat processing food products in direct contact with the coating on the interior or exterior surfaces of the container. No significant or economical advantages are recognized in applying a coating for food containers fabricated from metal plate a coating weight greater than 15.0 milligrams per square inch of surface. In the general utility of the coatings, they represent the entire surface coating on the interior or exterior substrate of the container.

Representative coating compositions prepared in accordance with the present invention are given in Table I below, identified as Composition Nos. 1, 2 and 3. For purposes of comparison, compositions formulated in a manner outside the scope of the present invention are given in Table I and are identified as Compositions No. 4 through 9.

The constituents of the coating formulation listed in Table I were dispersed in a volatile solvent mixture of 47% by weight of Solvesso 150, 23.0% by weight aliphatic Isopar, and 30% by weight of a mixture of diisobutyl ketone and isophorone.

TABLE I

| Components, Parts by Weight | Composition No. | | | | | | | | |
|---|---|---|---|---|---|---|---|---|---|
| | 1 | 2 | 3 | 4 | 5 | 6 | 7 | 8 | 9 |
| Vinyl chloride homopolymer (Bakelite OYNV) | 32.85 | 29.96 | 26.24 | 33.00 | 32.85 | 32.85 | 32.85 | 32.85 | 33.00 |
| Vinyl chloride copolymer (Bakelite VMCC) | 4.48 | 4.10 | 6.56 | 4.50 | 4.48 | 4.48 | 4.48 | 4.48 | 4.50 |
| Dioctyl phthalate | 7.48 | 6.84 | [1] 5.00 | 7.50 | 7.48 | 7.48 | 7.48 | 7.48 | 8.00 |
| TiO$_2$ pigment | | 8.55 | 16.40 | | | | | | |
| Methylol/phenol ether (GE 77108 Methylon) | 1.95 | 1.80 | 1.00 | | 1.95 | 1.95 | 1.95 | 1.95 | 1.95 |
| Epoxy Resin (ERL 2774) | 7.47 | 6.84 | 4.00 | 7.48 | | 7.47 | 7.47 | 7.47 | 7.47 |
| Epoxidized triglyceride (Epoxol 9-5) | 0.51 | 0.48 | 0.65 | 0.51 | 0.51 | 0.51 | | | [2] 0.51 |
| Triazine-aldehyde resin (MX–61) | 0.51 | 0.55 | 0.50 | 0.51 | 0.51 | | 0.51 | | 0.51 |
| Volatile solvent | 44.75 | 40.88 | 39.65 | 46.50 | 52.22 | 45.26 | 45.26 | 45.77 | 44.06 |

[1] Santicizer 141.
[2] Paraplex G–60, a product of Rohm and Haas Company, a high molecular weight epoxidized soybean oil having an average molecular weight of about 1,000, a specific gravity at 25° C. of 0.990 to 0.995, and an oxirane content of 6.3 average, 6.8 maximum.

The coating compositions of Table I were roll coated upon one side of a tin plate metal of the grade corresponding to that employed in the fabrication of conventional tin cans to provide coatings having a film weight of 4.5 to 6.5 milligrams per square inch and were baked for 8 to 10 minutes at an oven temperature of about 400° to about 410° F. The coated sheet metal was then fabricated into cans using conventional can manufacture techniques wherein the coated portion formed the interior of the can.

After fabrication of the coated containers, the coatings were examined for flexibility, corrosion resistance, adhesion, and resistance to the elevated temperatures encountered in the canning industry. The tests included:

The results of the coating tests are recorded in Table II below.

TABLE II

| Composition No. | Flexibility | Film continuity | Rust resistance | Heat resistance | Mar resistance | Adhesion after pasteurization | Ghosting | Storage stability |
|---|---|---|---|---|---|---|---|---|
| 1 | Very good | Very good | Very good | Very good | Very good | Very good | None | Good up to one year. |
| 2 | do | do | do | do | do | do | do | Do. |
| 3 | do | Good | Good | do | do | do | do | Do. |
| 4 | Satisfactory | do | NT[1] | Good | Satisfactory | Fair | NT | NT. |
| 5 | Mediocre | Fair | NT | do | Satisfactory to mediocre | do | NT | NT. |
| 6 | Good | NT | NT | Unsatisfactory | Satisfactory | Unsatisfactory | NT | NT. |
| 7 | do | NT | NT | do | do | do | NT | NT. |
| 8 | Satisfactory | NT | NT | do | do | do | NT | NT. |
| 9 | do | Fair | NT | do | do | Fair | NT | NT. |

[1] NT=Not tested.

(1) Flexibility

The ability of the coating to remain flexible and resist fracturing during the mechanical operations involved in the fabrication of the container were observed by subjecting the coated blank to immersion in an acidic copper sulfate solution for 5 minutes to observe the permeation of the copper sulfate through the films. The penetration of the solution with resultant deposition of copper on the substrate is an indication of failure of the films in the stamping or fabricating operation. Such staining is especially likely to occur at shoulders and corrugations in the films where the coated metal is severely stressed or deformed.

(2) Film continuity

A coated container is filled with a 1% solution of NaCl and the current flow through the coating is measured when a standard potential is applied between the can body and a steel electrode immersed in the center of the solution. The coating material of Table I is acceptable if a current flow less than 0.5 milliamperes is recorded using this test.

(3) Rust resistance

The externally coated plate is formed into ends and can bodies and after double seaming the end on the can body, the assembled can is placed in a humidity cabinet at 120° F. for 72 hours. After this time period, the sample is inspected for rust spots. A sample having less than 10 rust spots is considered commercially satisfactory.

(4) Heat resistance

To determine the ability of the coatings to withstand heat degradation, a sample of a coated substrate is placed in an air oven for 20 minutes at 415° F. The coating is then examined for burning, i.e., discoloration of the coating.

(5) Pasteurization

A coated container is filled with water or beer, sealed, and subjected to pasteurization temperatures in agitated, heated water at 155° F. for 30 minutes. A test sample is cut from the container and the film scored with a sharp instrument in the shape of an X. A piece of cellophane tape is pressed against the X score to determine whether the coating can be lifted from the metal substrate.

(6) Ghosting

The baked coating is examined for non-uniformity which appears as a "ghost" or shadow due to non-uniform flow of the cured coating on the metal substrate after baking in an industrial oven.

(7) Mar resistance

The can coating is examined for scratches and other marks after manufacture.

(8) Storage stability

The liquid coating material is stored in containers at ambient conditions and periodically examined for changes in original properties.

By referring to Table II, it is at once apparent that the coating compositions of the present invention (Composition Nos. 1–3) have excellent flexibility, adhesion and heat resistance especially when compared to coating compositions which have been prepared in a manner outside the scope of the present invention (Composition Nos. 4–9).

What is claimed is:

1. A coating composition which may be deposited directly on a bare metal surface comprising a dispersion in a volatile organic solvent of (1) an organosol component comprising (a) a dispersion grade vinyl chloride homopolymer; (b) a solution grade vinyl chloride copolymer; (c) a plasticizer; (2) an adhesion promoting component combination of a methylol phenol ether and a low molecular weight epoxy resin; and (3) a heat stabilizing component combination of an epoxidized triglyceride having an oxirane content of at least 7.5% and a triazine-aldehyde resin.

2. The coating composition of claim 1 wherein the organosol component of the coating composition is present in the range of about 60% to about 90% by weight of the non-volatile constituents of the coating composition, the dispersion grade vinyl chloride homopolymer constituting about 50% to about 75% by weight of the organosol component, the solution grade vinyl chloride copolymer constituting about 10% to about 25% by weight of the organosol component and the plasticizer constituting about 10% to about 25% by weight of the organosol component.

3. The coating composition of claim 1 wherein the adhesion promoting component combination of the coating composition is present in the range of about 7.5% to about 30% of the non-volatile constituents of the coating composition, the ratio by weight of the methylol phenol ether to epoxy resin ranging from 1:3 to 1:12.5.

4. The coating composition of claim 1 wherein the heat stabilizing component combination of the coating composition is present in the range of about 0.5% to about 10% by weight of the non-volatile constituents of the coating composition, the ratio by weight of the triazine-aldehyde resin to the epoxidized triglyceride is generally maintained within the range of 1:3 to 3:1.

5. The coating composition of claim 1 wherein the vinyl chloride copolymer is a vinyl chloride/vinyl acetate/maleic acid copolymer.

6. The coating composition of claim 1 wherein the methylol phenol ether is a mixture of the allyl ethers of mono-, di- and trimethylol phenols.

7. The coating composition of claim 1 wherein the epoxy resin is the condensation product of epichlorhydrin and p,p'-isopropylidenediphenol and has an average molecular weight in the range of 300 to 450.

8. The coating composition of claim 1 wherein the epoxidized triglyceride is an epoxidized linseed oil having an oxirane content of at least 9%.

9. The coating composition of claim 1 wherein the triazine-aldehyde resin is a melamine-formaldehyde resin.

10. The coating composition of claim 1 wherein the total non-volatile content is in the range of about 20% to about 70% by weight based on the total weight of the liquid composition.

References Cited

UNITED STATES PATENTS

| | | | |
|---|---|---|---|
| 2,579,330 | 12/1951 | Martin | 260—613 |
| 2,917,481 | 12/1959 | Masters | 260—33.2 |
| 3,188,263 | 6/1965 | Pflaumer | 260—21 |
| 3,305,602 | 2/1967 | Bromstead | 260—899 |

DONALD E. CZAJA, Primary Examiner

D. J. BARRACK, Assistant Examiner

U.S. Cl. X.R.

117—132, 161; 260—23, 30.4, 30.6, 31.8, 33.2, 33.4, 45.8, 45.85, 45.9, 899, 834, 836, 39, 41